United States Patent
Viarengo et al.

(10) Patent No.: US 7,567,912 B2
(45) Date of Patent: Jul. 28, 2009

(54) METHOD AND SYSTEM FOR AUTOMATICALLY DETECTING THAT INTERNATIONAL SHIPMENT MOVEMENT HAS SATISFIED A THRESHOLD CONDITION

(75) Inventors: Steve M. Viarengo, Danville, CA (US); Mark T. Cook, San Francisco, CA (US); Kristopher W. Karras, Daly City, CA (US)

(73) Assignee: TradeBeam, Inc., San Mateo, CA (US)

(*) Notice: Subject to any disclaimer, the term of this patent is extended or adjusted under 35 U.S.C. 154(b) by 312 days.

(21) Appl. No.: 11/257,414

(22) Filed: Oct. 24, 2005

(65) Prior Publication Data

US 2006/0095358 A1 May 4, 2006

(51) Int. Cl.
*G06Q 10/00* (2006.01)
(52) U.S. Cl. .................. 705/1; 705/7; 705/19; 705/26; 705/27; 705/28; 705/34; 705/39; 705/40
(58) Field of Classification Search .................. 705/1, 705/7, 26, 27, 28, 37, 34, 39, 40, 500
See application file for complete search history.

(56) References Cited

U.S. PATENT DOCUMENTS

| | | | |
|---|---|---|---|
| 5,168,444 A | 12/1992 | Cukor et al. | |
| 5,704,045 A | 12/1997 | King et al. | |
| 5,710,889 A | 1/1998 | Clark et al. | |
| 5,717,989 A * | 2/1998 | Tozzoli et al. | 705/37 |
| 6,058,378 A | 5/2000 | Clark et al. | |
| 6,141,653 A | 10/2000 | Conklin et al. | |
| 6,151,588 A | 11/2000 | Tozzoli et al. | |
| 6,285,916 B1 | 9/2001 | Kadaba et al. | |
| 6,338,050 B1 | 1/2002 | Conklin et al. | |
| 6,873,963 B1 | 3/2002 | Westbury et al. | |
| 6,460,020 B1 | 10/2002 | Pool et al. | |
| 6,526,443 B1 | 2/2003 | Goldsmith et al. | |
| 6,571,149 B1 | 5/2003 | Hahn-Carlson | |
| 6,859,787 B2 | 2/2005 | Fisher et al. | |
| 6,862,577 B2 | 3/2005 | Gagne et al. | |
| 6,915,268 B2 | 7/2005 | Riggs et al. | |
| 7,136,832 B2 | 11/2006 | Li et al. | |
| 7,155,409 B1 * | 12/2006 | Stroh | 705/37 |
| 7,249,069 B2 * | 7/2007 | Alie et al. | 705/28 |
| 2002/0013767 A1 | 1/2002 | Katz | |
| 2002/0032612 A1 | 3/2002 | Williams et al. | |
| 2002/0038277 A1 | 3/2002 | Yuan | |
| 2002/0091574 A1 | 7/2002 | Lefebvre et al. | |
| 2002/0107785 A1 | 8/2002 | Melchior et al. | |
| 2002/0133509 A1 | 9/2002 | Johnston et al. | |

(Continued)

OTHER PUBLICATIONS

*Tradecard, Inc. v. S1 Corp.*, 509 F. Supp. 2d 304 (S.D.N.Y. 2007).

(Continued)

*Primary Examiner*—Yogesh C Garg
(74) *Attorney, Agent, or Firm*—Haynes Beffel & Wolfeld LLP

(57) ABSTRACT

The present invention relates to a network that tracks international shipments. In particular, it relates to automatic linking of supporting documents to electronic reports of shipment movements, including cross-border movements, and automatic detection when a shipment movement has reached a threshold condition, which may to be reported to an interested party, such as a bank.

10 Claims, 9 Drawing Sheets

U.S. PATENT DOCUMENTS

| | | | |
|---|---|---|---|
| 2002/0193986 A1* | 12/2002 | Schirris | 704/8 |
| 2003/0009361 A1 | 1/2003 | Hancock et al. | |
| 2003/0033179 A1* | 2/2003 | Katz et al. | 705/7 |
| 2003/0036976 A1* | 2/2003 | De Ruwe | 705/27 |
| 2003/0040947 A1 | 2/2003 | Alie et al. | |
| 2003/0069831 A1 | 4/2003 | Le et al. | |
| 2003/0110128 A1 | 6/2003 | Foth et al. | |
| 2003/0115072 A1 | 6/2003 | Manucha et al. | |
| 2003/0140011 A1 | 7/2003 | Ishimi et al. | |
| 2004/0215467 A1* | 10/2004 | Coffman et al. | 705/1 |
| 2005/0177447 A1 | 8/2005 | Napier et al. | |
| 2006/0173693 A1 | 8/2006 | Arazi et al. | |

OTHER PUBLICATIONS

PCT International Search Report for International Application No. PCT/US06/60162 dated Nov. 7, 2007.

Murphy, Jean V., Everyone Wants 20120 Vision When Peering Into The Supply Chain, Jun. 2000.

TradeCard, Inc., "Financial Supply Chain Automation: The Missing Link in Supply Chain Management" White Paper, Jan. 2002.

Bolero.net. "Document Definitions in alphabetical order" Apr. 10, 2001 <http://web.archive.org/web/20010410202536/www.bolero.net/boleroxml/docdef/alphabetical.ph3>.

Bolero.net. "Core Messaging Platform" Oct. 10, 2000 <http://web.archive.org/web/20001010031022/www.bolero.net/decision/service/index.php3>.

Bolero.net. "Introduction to'Bolet-o XML" Aug. 31, 2001 <http://web.archive.org/web120010831065457/www . . . bolero.neffboleroxml/introduction/index/php3>.

Bolero.net. "Documentary Credit Application" Apr. 28, 2001 <http://web.archive.org/web/20010428140019/www . . . bolero.neVboleroxml/docdef/link14.php3>.

Bolero.net. "Exporters Documentary Credit Presentation Instruction" Apr. 21, 2001 <http:/web.archive.org/web/20010421195008/www. bolero.net/boleroxml/docdef/link43.php3>.

Bolero.net. "Documentary Credit Notification" Apr. 19, 2001 <http://web.archive.org/web/20010419085651/www. bolero.net/boleroxml/docdef/linkl5/php3>.

Bolero.net. "Documentary Credit Acknowledgement" Apr. 21, 2001 <http://web.archive.org/web/20010421193422/www.bolero.net/boleroxml/docdef/link38.php>.

Bolero.net. Documentary Credit Amendmenr Apr. 21, 2001 <http://web.archive.org/web/20010421194253/www.bolero.net/boleroxml/docdef/linkl3.php>.

Bolero.net. "Documentary Credit Amendment Request" Jun. 28, 2001 <http://web.archive.org/web/20001628184424/www.bolero.net/boleroxml/docdef.link42.php3>.

International Search Report and Written Opinion of the International Search Authority for Intl. Appl. No. PCT/US05/04088 mailed Oct. 5, 2006.

"Banking & Finance Technology"; Fourth edition; American Bankers Association; Washington DC 20036; 1999; p. 133.

International Search Report and Written Opinion of the International Search Authority for Intl. Appl. No. PCT/US05/04259 mailed Nov. 2, 2006.

All Open Orders For Customer Number labeled as Motorola, Nov. 23, 1999.

Information on Realtor Workstation, 2000.

Office Action mailed Nov. 12, 2003, U.S. Appl. No. 10/228,158.

Office Action mailed Jul. 22, 2004, U.S. Appl. No. 10/228,158.

Office Action mailed Jan. 11, 2005, U.S. Appl. No. 10/228,158.

Office Action mailed Jul. 13, 2005, U.S. Appl. No. 10/228,158.

Office Action mailed Sep. 23, 2005, U.S. Appl. No. 10/228,158.

Office Action mailed May 17, 2006, U.S. Appl. No. 10/228,158.

Office Action mailed Mar. 29, 2007, U.S. Appl. No. 10/228,158.

Final Office Action mailed Nov. 20, 2007, U.S. Appl. No. 10/228,158.

Office Action mailed Aug. 7, 2008, U.S. Appl. No. 10/228,158.

Office Action mailed Aug. 31, 2007, U.S. Appl. No. 10/287,447.

Final Office Action mailed Mar. 28, 2008, U.S. Appl. No. 10/287,447.

Office Action mailed Sep. 15, 2006, U.S. Appl. No. 10/776,587.

Final Office Action mailed Mar. 29, 2007, U.S. Appl. No. 10/776,587.

Office Action mailed Sep. 13, 2007, U.S. Appl. No. 10/776,587.

Office Action mailed Jan. 4, 2008, U.S. Appl. No. 10/776,079.

Final Office Action mailed Oct. 28, 2008, U.S. Appl. No. 10/776,079.

* cited by examiner

| PORTAL | | | | |
|---|---|---|---|---|
| Quick Links ⌐ 610 | Quick Search ⌐ 620 ⌐ 621 | | | |

⌐ 611
| Links |
|---|
| Search Invoices |
| Search Trade Finance Requests |
| Search Letters of Credit |
| Active Document Presentment |
| Export Screenings |
| Trade Documents |

| Reports |
|---|
| Run Reports |
| View Report Results |

Doc Type [    ▼]    ⌐ 622
Reference         Reference ID [        ]

[Search] [Clear] [Refresh] ⌐ 623

⌐ 624
| Exception Conditions | |
|---|---|
| Description | No. of Results |
| Trade Finance Requests Overdue Payment | 4 Trade Finance Requests |
| LC Applications Overdue Issuance | 3 Letter of Credit Application |
| LC Drawings Presented Overdue Payment | 7 Letter of Credit Drawing |
| Doc Collections (Sight) Overdue Payment | 11 Doc Collection |
| Loan Requests Overdue Response | 9 Loan Request |
| Status Summary | |
| Description | No. of Results |
| Approved Trade Finance Requests | 14 Trade Finance Requests |
| High Risk Trade Finance Requests | 19 Trade Finance Requests |
| Medium Risk Trade Finance Requests | 10 Trade Finance Requests |
| Low Risk Trade Finance Requests | 23 Trade Finance Requests |
| LC Applications Pending Approval | 12 Letter of Credit Applications |
| LC Drawings Presented Pending Approval | 17 Letter of Credit Drawings |
| Loan Requests Pending Approval | 8 Loan Requests |

FIG. 6

| Events | | | | |
|---|---|---|---|---|
| Event Plan | | | | |
| Event Plan Details — 710 | | | | |
| Page 1 of 1 (9 record(s) found.) — 711 — 712 — 713 — 714 — 715 | | | | |
| Event Name | Expected Location | Expected Date/Time | Actual Location | Actual Date/Time |
| Delivered to Warehouse | | 3/11/2005 12:00 | | |
| Vessel Arrived | | 3/9/2005 12:00 | | |
| Invoice Received | | 3/6/2005 12:00 | | |
| Vessel Departed | | 3/4/2005 12:00 | | |
| Loaded on Vessel | | 3/4/2005 12:00 | | 3/3/2005 12:00 |
| Transportation Provided | | 2/24/2005 12:00 | | |
| Insurance Provided | | 2/22/2005 12:00 | | |
| PO Acknowledgement | | 2/13/2005 12:00 | | 2/14/2005 12:00 |
| Approved | | 2/13/2005 12:00 | | 2/13/2005 12:00 |

FIG. 7

Event Activity

Add Actual Event — 810

Event Name  [Loaded on Vessel ▼] — 811
Event Date  [        ] — 812
Event Location [        ] — 813    Linked Documents
                                    [Save] [Cancel]

Reference Type — 820
Purchase Order Num [        ] — 821     House bill of lading number [        ] — 822

FIG. 8

| Linked Documents | | | |
|---|---|---|---|
| View Linked Documents | | | |
| Linked Documents — 910 — 911 — 912 — 913 — 914 | | | |
| Document Type | Document Name | Linked Date | Linking User |
| Purchase Order | 45678 | 2005-02-16 23:47:41:0 | SYSTEM |
| Trade Finance Request | dummy | 2005=03-09 19:12:22:0 | SYSTEM |

| Invoice Header Group — 1010 | | | |
|---|---|---|---|
| Invoice Number: | 33445566 | Invoice Date: | 03/02/2005 |
| Status: | Begun | Purchase Order Number: | |
| Purchase Order Date: | ⎡— 1011 | Invoice Billing Price: | |
| Payment Terms: | Net 30 Days | Payment Method: | Bank Transfer |
| Remit To: | | Scheduled Delivery Date: | |
| Due Date: | | Air Waybill Number: | |
| Airway Bill Date: | | Bill of Lading Number: | |
| BOL Date: | | Letter of Credit Number: | |
| Letter of Credit Date: | | Letter of Credit Remarks: | ⎡— 1013 |
| Inco Terms: | Free on Board | Inco Terms Location: | Oakland |
| | ⎣— 1012 | | Unknown |
| Freight Terms: | | Country of Origin: | |
| Place/Port of loading: | | Place/Port of discharge: | |
| Port of Entry: | | | |
| Description: | | Notes: | |

| Parties — 1020 | | — 1021 | | — 1022 | |
|---|---|---|---|---|---|
| Buying Party | | | Supplier | | |
| Name: | Buyer, Inc. | | Name: | Distributors, Inc. | |
| Address 1: | Two Waters Park | | Address 1: | | |
| Address 2: | | | Address 2: | | |
| Address 3: | | | Address 3: | | |
| City: | San Mateo | | City: | Hong Kong | |

FIG. 11

| Summary | Details | | |
|---|---|---|---|
| — 1110 | — 1120 | | |
| Header — 1111 | | | |
| Request Number: | TFR00090 | Request Date: | 3/2/2005 |
| Status: | Begun | Invoice Number: | |
| Sub-Type: | | Payment Terms: | Net 30 Days |
| Amount: | 100000 | Payment Method: | Bank Transfer |

| Parties — 1112 | — 1113 | | — 1114 | |
|---|---|---|---|---|
| Bank | | | Applicant | |
| Name: | Big Bank | | Name: | Distributors, Inc. |
| Address 1: | One Big Bank Way | | Address 1: | One Supplier Way |
| Address 2: | | | Address 2: | |
| Address 3: | | | Address 3: | |
| City: | San Francisco | | City: | Hong Kong |
| State/Province: | CA | | State/Province: | |
| Postal Code: | | | Postal Code: | |
| Country: | USA | | Country: | Hong Kong |
| Notes: | | | Notes: | |

| PORTAL | | | |
|---|---|---|---|
| Quick Links | Quick Search | | |

*— 610*

Links (1211)
- Search Orders
- Search Invoices
- Active Document Presentment
- Export Screenings
- Product Catalog
- Reuters
- Alerts
- Trade Documents
- Record Event

Reports (612)
- Run Reports
- View Report Results

Doc Type [ ▼ ]
Reference      Reference ID [ ]

[ Search ] [ Clear ] [ Refresh ]

*— 624*

| Exception Conditions | |
|---|---|
| Description | No. of Results |
| Order Acknowledgement Overdue | 0 Purchase Order |
| Orders Shipping Instructions Overdue | 3 Purchase Orders — 1221 |
| Order Payment Overdue | 0 Purchase Order |
| Invoices Overdue Approval | 0 Invoice — 1222 |
| Trade Finance Requests Overdue Payment | 3 Trade Finance Requests |

*— 625*

| Status Summary | |
|---|---|
| Description | No. of Results |
| Orders Awaiting Acknowledgement | 0 Purchase Order |
| Orders Awaiting Shipping Instructions | 3 Purchase Orders — 1226 |
| Orders Awaiting Invoice - FOB | 0 Purchase Order |
| Invoices Awaiting Approval | 0 Invoice |
| Open Account 30 Days | 4 Invoices — 1227 |
| Open Account 60 Days | 0 Invoice |
| Open Account 90 Days | 0 Invoice — 1228 |
| Approved Trade Finance Requests | 3 Trade Fiannce Requests |
| Letters of Credit Awaiting Presentment | 0 Letter of Credit Document |

METHOD AND SYSTEM FOR AUTOMATICALLY DETECTING THAT INTERNATIONAL SHIPMENT MOVEMENT HAS SATISFIED A THRESHOLD CONDITION

RELATED APPLICATION

This application is related to the commonly owned U.S. patent application Ser. No. 10/776,587, entitled "Systems and Methods to Support Approval to Settle an International Trade From a Credit Facility, Such as a Line of Credit or a Demand Deposit Account" by inventors Graham R. F. Napier, Steve M. Viarengo, Manoj Narayan, and Allen R. Bornscheuer and Ser. No. 10/776,079, entitled "Negotiation and Fulfillment of Insurance Conditions and Release of Goods for Export" by inventors Graham R. F. Napier, Steve M. Viarengo and Manoj Narayan, both filed on Feb. 11, 2004 and owned by the same assignee as this application, now and at the time of the invention. The co-pending applications are incorporated by reference as if fully set forth herein.

COPYRIGHT NOTICE

The screen images in FIGS. 6-14 contain material that is subject to TradeBeam Inc.'s copyright protection. The copyright owner has no objection to the facsimile reproduction by anyone of the patent document or this patent disclosure as it appears in the Patent and Trademark Office patent file or records, but otherwise reserves all copyright rights whatsoever.

BACKGROUND OF THE INVENTION

The present invention relates to a network that tracks international shipments. In particular, it relates to automatic linking of supporting documents to electronic reports of shipment movements, including cross-border movements, and automatic detection when a shipment movement has reached a threshold condition, which may be reported to an interested party, such as a bank. Particular embodiments and aspects are described in the claims, specification and drawings.

Banks are among the last actors remaining to be integrated into customers' electronic reporting systems and particularly into international trade shipment movement tracking systems. Opportunities for foreign trade financing may entice the banks to become more integrated with systems used by customers.

Prior related applications have described systems that support letter of credit and documentary credit facilities. As banks have gradually accepted the other facilities, an opportunity has arisen to more fully integrate them into the international trade system, using appropriate interfaces and secure computer systems. Better, more easily arranged and managed tracking of international shipment movement and readiness of particular shipments in transit for trade financing may result.

BRIEF DESCRIPTION OF THE DRAWINGS

FIG. 6-14 illustrate an embodiment of a graphical user interface to the system described, which implements information flows described.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

Embodiments and aspects of embodiments described below can be applied to solve various technical problems. One problem for international shipment movement is how to automatically identify a threshold condition of interest and associated document collection requirements, collect shipment movement status information from data sources, link associated supporting documents to electronic reports of shipment movement, and determine from the reports when the threshold condition has been satisfied. It is useful to automatically determine the condition of interest, because shipment handlers and order processors are unlikely to understand the implications of data that they enter. While the term "threshold condition" is used, this is somewhat redundant; automatically determining a condition to be satisfied is an alternative description. The threshold condition can be derived from INCO-coded shipment terms and set in a database of threshold conditions that apply to particular shipment movements. Depending on the threshold condition that applies, one set or another of associated supporting documents need to be collected and linked to the shipment movements data. For instance, if the INCO-coded shipment term is "FOB" for free-on-board, the system can set a threshold condition corresponding to a data source reporting that the shipment has been loaded on a ship. The system automatically monitors reports of the shipment movement. When the loading agent or shipping company reports that the shipment has been loaded and links a copy of the shipping company's bill of lading to the report, the threshold condition is met. (In accordance with the FOB term, ownership of the shipment transfers from the seller to the buyer.) Electronically detecting that the threshold condition has been met triggers the system to issue an electronic report to one or more interested parties not handling the shipment movements, alerting them to review the linked documents.

Figure 1:
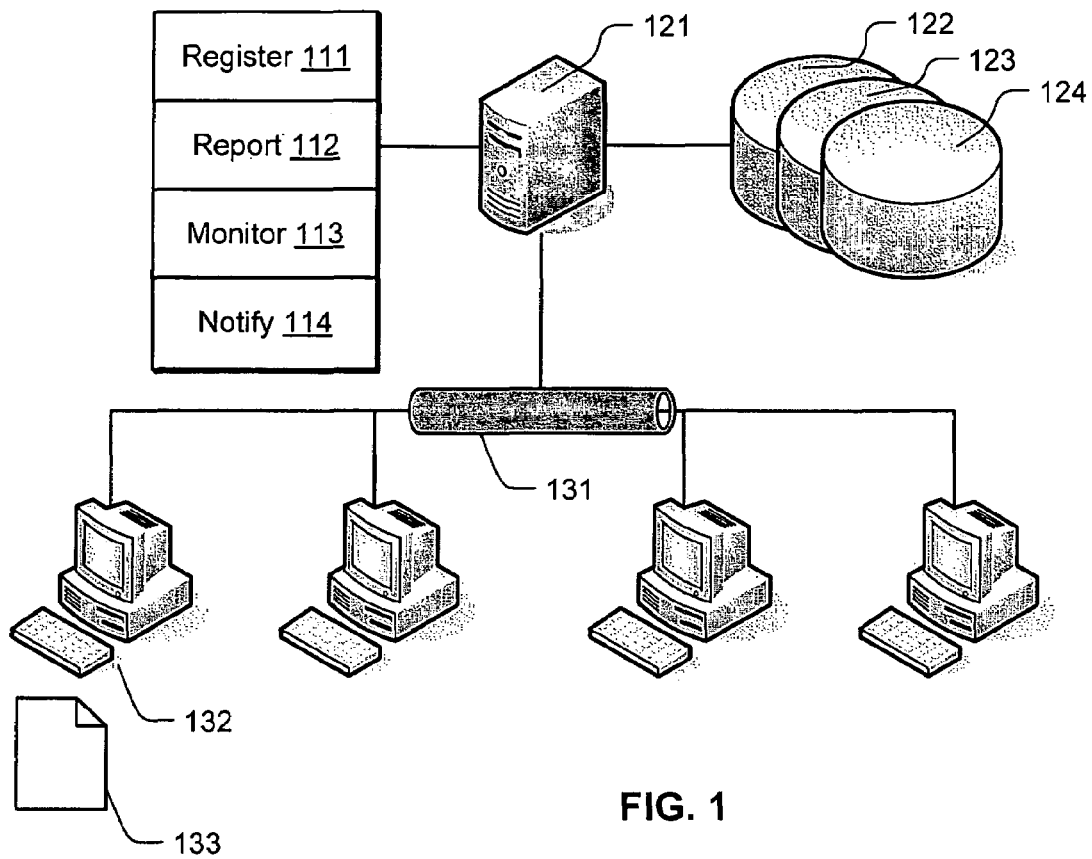
FIG. 1 is a block diagram of an international shipment movement tracking system.

FIG. 1 is a block diagram of an international shipment movement tracking system. A shipment is more likely to be a freight container than an individual unit delivered to someone's home.

A plurality of users 132 are connected by a network 131 to a server 121 that includes logic 111-14 and storage 122-24. Typically, the users are in different countries. The workstations they use 132 may be terminals, PCs or other systems adapted to display user interfaces and accept input. Alternatively, they may use systems adapted to send messages regarding shipment movement, directed to a central server. While the diagram indicates that the workstations are connected by a wired network, they may as easily be connected by combination of a wired and wireless network.

The users communicate with at least one server 121. Components of the logic include modules to register users 111, report shipment movement initiation and progress 112, monitor shipment movement 113 to test whether a threshold condition has been satisfied, and notify 114 a party not involved in moving shipments when the threshold condition has been met. While the modules are indicated as logically distinct, they may be coded sections of a single program. The storage includes user registration 122, threshold conditions 123 and shipment movement reports 124.

The registration module 111 handles normal registration tasks, such as security, plus assignment of roles to users and configuration of user interfaces according to the roles. The user's role will be associated with their organization's part in the movement of shipments or other position of interest. The user's role will further reflect their position within an organization. Based on a user's role, the user interface presents data entry and display opportunities adapted to efficient data collection and review.

The report module 112 accepts initial and subsequent reports of shipment movement. The initial report regarding a shipment, in one or more data entry sessions, will include information from which a threshold condition can be identified. The system automatically translates a description of a shipment movement plan into one or more threshold conditions. Automatic configuration of threshold conditions is useful because a data entry clerk or order processing clerk is unlikely to understand implications of the shipment movement plan that they are entering. For instance, INCO terms can be translated automatically by the system into threshold conditions based on roles assigned to users. Roles may include exporter, freight forwarder and ship operator. One INCO term is free on board (FOB). This term is satisfied after the freight forwarder delivers the shipment to the vicinity of a ship, when the stevedores load the goods into the hold. Another INCO term is free along side, which is satisfied earlier than FOB. Automatic configuration of threshold conditions translates INCO terms or other shipment movement term descriptions into reporting conditions. These reporting conditions may be tied directly to requirements for supporting documentation or may trigger additional logic tied, for instance, to the identities of the originator and the destination. From the initial shipment movement plan, including INCO terms or the like that are expressed in the plan or implied from the identities of the originator and destination, the system computes at least one threshold condition and then determines required supporting documentation.

The report module 112 registers reports of shipment movement beyond the initial shipment movement plan. As the good passes from one actor to the next, one or both of the actors reports the handoff. In addition, the report module may track the progress of shipment movement while it is in the hands of a particular actor, such as processing GPS reports of the location of a ship crossing the ocean.

The report module 112 further automatically links supporting documents 133 submitted by a user 132 to the record of shipment movement for a particular shipment. Documents can be submitted as image files, such as PDF or TIF files. These image files can be generated in any of the conventional ways, such as scanning, fax capture or generation directly to PDF. The image file typically is uploaded from a user screen. It could alternatively be sent with an electronic message, for instance in an XML field or exposed from a location identified in an XML field.

The report module 112 further may receive an invoice and link it to a shipment movement plan or a specific shipment movement report. Linking of the invoice may be part of the threshold condition.

The monitoring module 113 compares reports of shipment movement 124 to a database of threshold conditions 123. The system detects that the progress of the shipment has reached the threshold condition, such as being loaded into the hold of the ship, and that supporting documentation has been linked to a movement report, consistent with the threshold condition. When the monitoring module detects that the threshold condition has been satisfied, the notification module 114 is invoked.

The notification module 114, among other things, processes notifications to interested parties who are not moving shipments. These parties are unlikely to track shipment movement as closely as the originator or destination. They receive a report when a threshold condition has occurred. For instance, a bank is not involved in moving shipments. However, it may finance a buyer's payment to a seller and it may factor the seller's account receivable. That is, it may pay the seller earlier than the buyer is contractually obligated to pay. The threshold condition may further include the buyer electing to finance the purchase from a line of credit or similar financial instrument. The notification module is invoked at the buyer's election when the shipment movement part of the threshold condition is satisfied.

Prompt entry of data by the buyer's agents may be strongly motivated by the bank's interest in the factoring opportunity. Paying an invoice 10 to 15 days early may result in a one half to one percent discount from the face value of the invoice. While the bank cannot charge extra interest for the early payment, it can take advantage of the discount. Alternatively, the buyer may take advantage of the discount by making early payment to the bank from a line of credit.

The notification module 114 may compose a shipment including all of the supporting documentation or may simply generate a notice and expose the supporting documentation to be accessed by the interested party. Alternatively, a status display may be updated, preferably with emphasis that draws the interested party's attention to their turn to act on the workflow.

Figure 2:
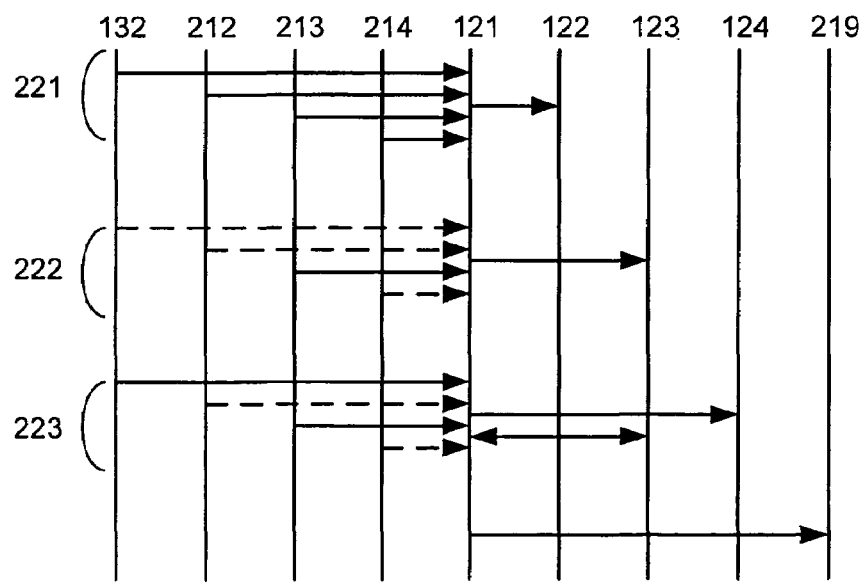
FIG. 2 depicts information flow among components identified in FIG. 1.

FIG. 2 depicts information flow among components identified in FIG. 1. Many of the components use the same reference numbers in FIG. 1, with data sources and notification destinations separately identified. For instance, data source terminals may be positioned with an exporter 132, an export freight forwarder 212, a ship operating company 213, and an import freight forwarder 214. An interested party 219 is also identified. In international movement of shipments, many more parties may be involved than shown in this diagram. The number of parties has been chose for illustration and to avoid introducing detail that does not assist the reader in understanding the disclosure.

Three information flows are grouped in FIG. 2. The first information flow 221 relates to registration of the actors. All of the actors are registered to the server 121, which stores the registrations in a database 122. One of the users, such as the exporter 132, may initialize the roles of the other participants. More commonly, the exporter 132 will authorize the exporter's agents to use the system and the importer will authorize the importer's agents. Some participants in moving shipments, such as a shipping company, may be pre-registered in the system and their authorization for particular shipment movements may depend on the shipping terms, on whether the goods in their possession are owned by the seller or buyer while in transit.

The second information flow 222 relates to reporting shipment movement. One of the participants initially registers the shipment movement plan with the server 121, which automatically generates a threshold condition and stores it in a database 123. The server 121 also determines what supporting logistical documentation is required to establish that the threshold condition has been met. The documentation may relate to a particular action, such as a bill of lading that demonstrates acceptance by a shipping company of goods, or it may include several documents leading up to the particular action, tracing from manufacture of the goods (e.g., a certificate of origin) through transport steps to the particular action. The required supporting logistical documents can be specified for a particular shipment movement, for a particular combination of originator and destination, for a particular buyer, or on a similar basis that allows the system to associate the required supporting logistical documentation with a particular shipment movement.

The third information flow 223 includes both updating of shipment movement status and detection that a condition has been satisfied. Parties involved in moving the shipment report update status information to the server 121, which records the information to the database 124. As reports are received, the server compares the updated status information to threshold condition stored in database 123. Once satisfaction of the threshold condition is detected by the server 121, a notification is generated to an interested party 219 who is not among the group of actors moving the goods.

Figure 3:
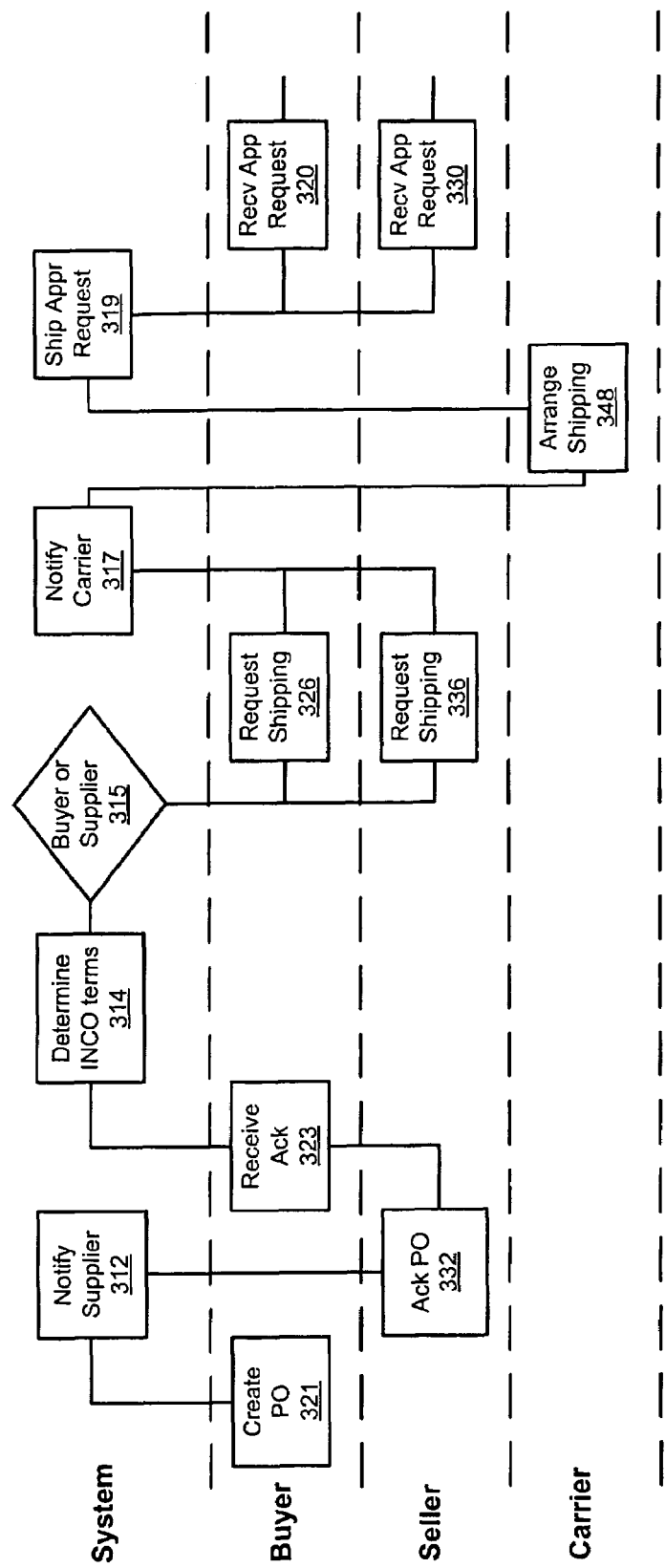
FIGS. 3-5 provide a more detailed flowchart of communications among data sources and an interested party.
Figure 4:
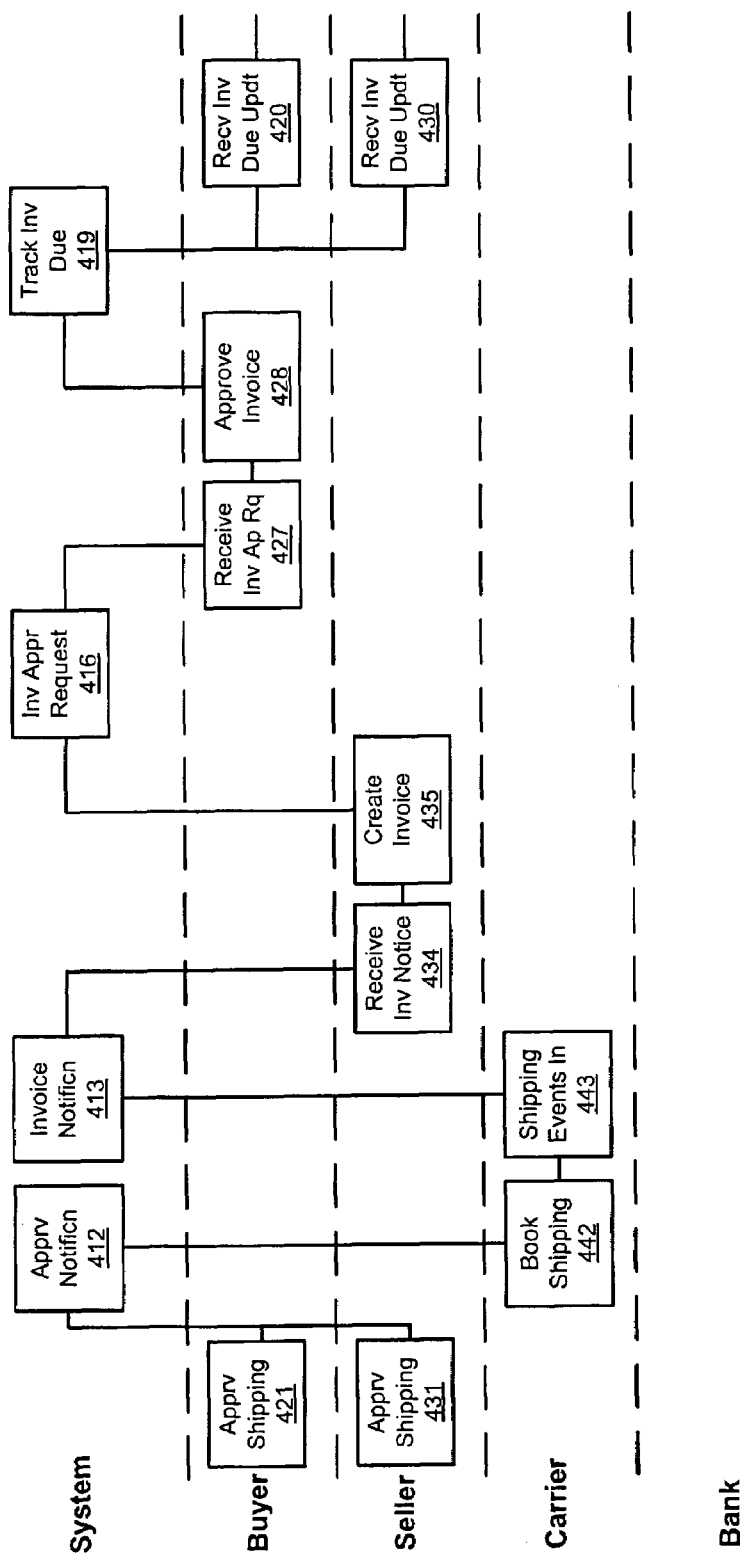
Figure 5:
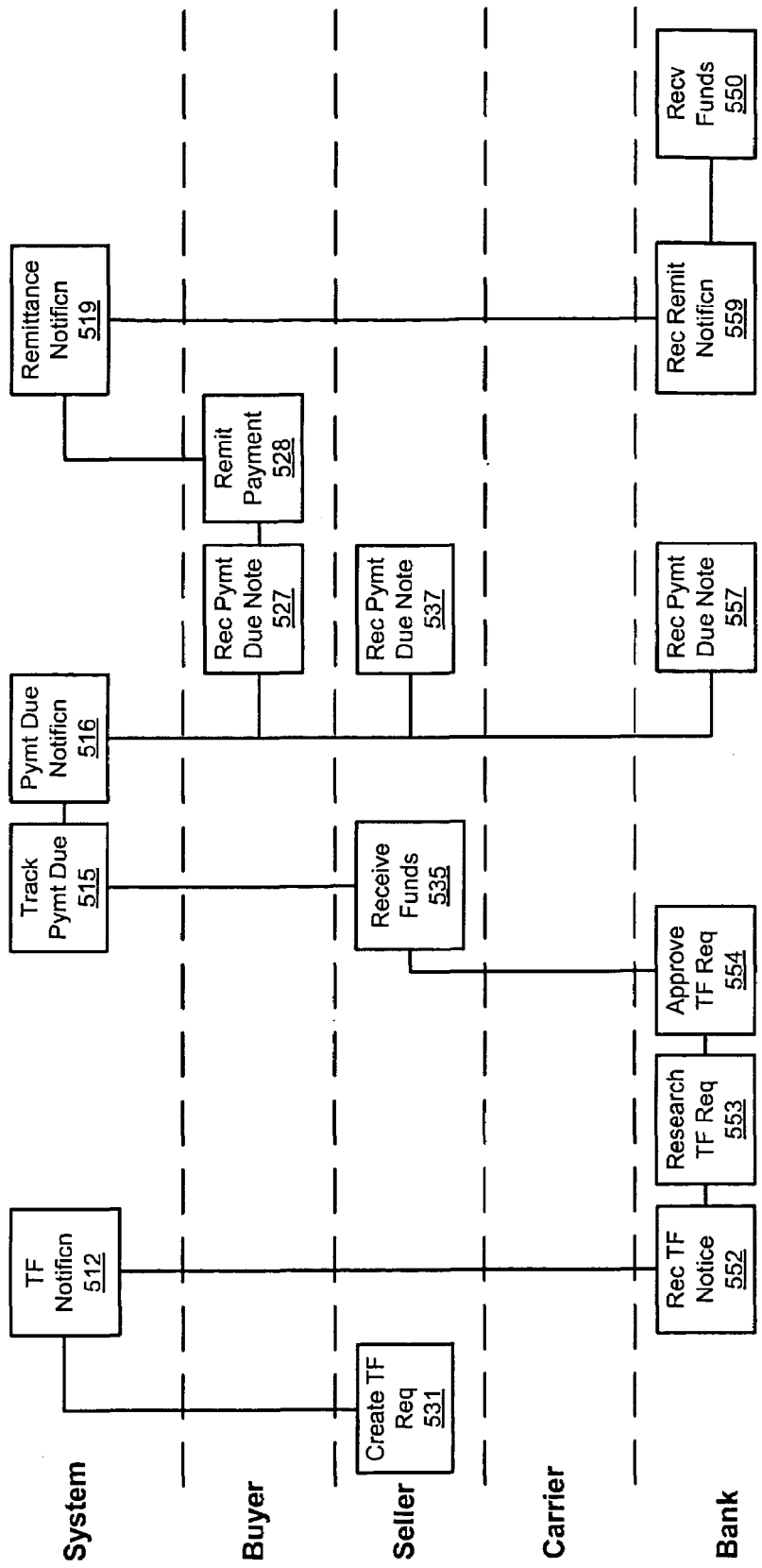

FIGS. 3-5 provide a more detailed flowchart of communications among data sources and an interested party. In each of the figures, actions taken by the system, including at least one server 121, appear in the top segment. The destination or buyer actions appear in a second segment. The seller comes next, followed by a one or more carriers and an interested party who is not involved in moving the goods, such as a bank.

In FIG. 3, the buyer creates 321 a purchase order. This purchase order is communicated to the system, which notifies 312 the supplier of the purchase order. The seller acknowledges 332 the purchase order. The acknowledgment is forwarded 323 directly or indirectly to the buyer. Acknowledgment in this sense is acceptance of the purchase order. Following agreement between the buyer and seller or their agents, the system receives as input 314 INCO or similar terms of shipment and title transfer. Depending on whether shipment is arranged by the buyer or seller 315, the system advises the buyer or seller to request shipping 326, 336. With a shipping request in hand, the system notifies 317 one or more carriers or freight forwarders to arrange shipping 348. The freight forwarders or carriers propose and request approval 319 of shipping arrangements. The system forwards the request for approval of shipping arrangements 319 to the appropriate party 320, 330.

In FIG. 4, the appropriate party approves shipping arrangements 421, 431 and the system generates an approval notification 412, prompting the freight forwarder or carrier to book the shipping arrangements 442. As shipment proceeds, shipping events are input 443 to the system. Required supporting documents also are uploaded and automatically linked. The system compares shipping events to the threshold condition and generates an invoice notification 413 to advise the seller that invoicing is considered timely. The seller receives the invoice notification 434 and creates an invoice 435. The system forwards an invoice approval request 416 to the buyer who receives the request 427. The buyer approves the invoice 428 and the system begins tracking inventory due 419. The system periodically provides the buyer and seller with updates on the invoice payment to 420, 430.

In FIG. 5, the buyer or seller optionally may create a trade finance request 531 which the system forwards as a notification 512 to an interested party, such as a bank. The bank receives the trade finance request notice 552, and researches it 553, including reviewing required supporting logistical documents that have been linked to the particular shipment movement. If all of the documents are in order, the bank approves the trade finance request 554.

If the request comes from the buyer to pay from a pre-arranged revolving line of credit (not shown), the bank optionally can pay the seller in due course, pay the seller at an early date with a pre-arranged discount, or contact the seller with a factoring proposal. Factoring, in this sense, is prepayment of an account due in return for a discount. For instance, if the seller's payment terms are net 30, FOB, payment is due 30 days after the shipment is on board a ship or other carrier. The bank can offer to pay in five days, instead of 30, in return for a one percent discount. This amounts to approximately 15% return, on an annualized basis, without increasing the bank's risk of extending credit to the buyer. Secure network links in support of prompt shipment movement reporting, combined with automatically linked supporting documents, significantly accelerates providing information to the bank, upon which the bank can base a factoring proposal. In another scenario, the seller's payment terms are net 30, FOB, with a one half percent discount for payment in 15 days. In this scenario, the bank accepts the trade finance request and pays in 15 days instead of 30. Or, the buyer can specify that payment be made in 15 days and finance only the discounted amount.

In the scenerio where the seller makes the trade financing request against an approved invoice, as depicted, the bank's risk is reduced by the short term credit worthiness of the buyer, whose payment will be remitted directly to the bank. After approval of the trade finance request 554, the seller receives funds 553. Payment of the seller's invoice is noted in the system and the system tracks payment due 515 to the bank. The system generates a payment due notification 516 which is received by at least the buyer 527 and bank 557. Optionally, the payment due notification also may be received by the seller 537. The buyer remits payment 528 and the system generates a remittance notification 519. The system may be configured so that it generates a request for transfer of funds from the buyer to the bank. The bank receives the remittance notification 559, typically before receiving funds 550.

FIGS. 6-14 illustrate an embodiment of a graphical user interface to the system described, which implements information flows described. Screens of this user interface are personalized to the role of the actor who uses them. FIG. 6, for instance, is personalized to a trade finance analyst at a bank. The main sections of this interface are the quick links 610, the quick search 620, the exception conditions list 624 and the status summary list 625. The quick links 610 include retrieval links 611 and report links 612. Retrieval links may include functions such as searching invoices, trade finance requests or letters of credit. It may include a review of active document resentments export screening and review of trade documents. The list of links revealed may depend on the context of the financial analyst's inquiry. (Compare FIG. 12, discussed below.) The reports link 610 may include running and viewing reports. Running reports may proceed as a background function. Reports to run may be saved for later viewing. The quick search 620 section supports searching by reference ID 62 within document type 621. Control buttons are provided 623. Two sections of status links are provided 624, 625. The exception conditions direct the user's attention to overdue situations. The status summary includes all pending tasks, whether timely or overdue.

FIG. 7 is a shipment movement plan that may be of interest to the movement participants, the buyer and seller, and even the bank. This view depicts event plan details 710 and actual events. Categories of details include event name 711, expected location 712, expected date and time 713, actual location 714 and actual date and time 715. In this event plan, a purchase order was actually approved on Feb. 14, 2005 at noon. The shipment or shipments are expected to arrive at their destination on Mar. 11, 2005 at noon. They were loaded on a vessel a day early, on Mar. 3, 2005.

FIG. 8 depicts an interface used to update the actual event column 715. The tabs of this interface are for an actual event 810 and a reference type 820. To add an actual event, the user selects the event name 811 and enters the event date 812 and location 813. The event date typically includes the time. The event location typically is chosen from a pre-populated pull-down list or matched to a list. A reference number 820 needs to be associated with an event. The reference number type may be a purchase order number 821, a house bill of lading number 822 or some other reference that has been associated with a particular shipment movement.

FIG. 9 depicts an interface used to account for or access linked documents 910. Linked documents are indicated by document type 911, document name 912, linking date and time 913 and user linking the document 914. In this example, the linked documents include a purchase order and a trade finance request. Typically, additional documents such as a the bill of lading and approved invoice would be required for processing of the trade finance request. The purchase order in this example is typically generated by another system and submitted either as a facsimile or electronic document to the system. The trade finance request may be prepared online by a system user as depicted in FIG. 11, or may be generated by another system and submitted either as a facsimile or electronic document to the system. Both of these documents have been captured and automatically linked to a particular shipment movement.

Updating of shipment movement event information, as depicted in FIG. 8, triggers an invoice request at an appropriate time. FIG. 10 depicts an invoice generated online using the system. Sections of the invoice include an invoice header 1010 and parties 1020. Many fields that are self-explanatory appear in the invoice header. Three terms of significance to payment are the payment terms 1011, the INCO terms 1012 and the INCO terms location 1013. The beginning date of the payment term is triggered by satisfaction of the INCO terms, FOB in this example. Either the INCO terms or a combination of the INCO terms and INCO terms location match the terms used by the system to automatically generate a threshold condition, satisfaction of which led to an invoice request and invoice. In the parties section of the invoice, the buying party 1021 and supplier 1022 are identified.

FIG. 11 is a trade finance request, submitted in this example by the supplier. The summary section 1110 is depicted in this figure. Details 1120 also are available. The sections of the summary interface include the header 1111 and parties 1112. A request number is assigned to the trade finance request, along with the date. An invoice number typically is required and may be automatically populated from another reference number associated with the shipment movement. Payment terms may be entered on the invoice or may have been captured earlier and linked to the invoice. In this example, the parties 1112 to the trade finance request are the bank 1113 and the distributor 1114.

The bank's research in response to the trade finance request is supported by the interface in FIG. 9, which exposes linked documents that support the trade finance request. In an alternative embodiment, the request and supporting documents may be transmitted to the bank in a message.

FIG. 12 depicts a variation on FIG. 6, as it might appear in response to export screening of the supplier's trade finance request. Some additional quick links appear in the links section 1211. The new links include search orders, product catalog, Reuters, alerts, and record event. [***Steve, do any of these links bear description?] In the exception conditions 624 related to this particular supplier, the trade finance analysts can see that order shipping instructions are overdue for three purchase orders 1221 and trade finance requests relate to overdue payments in three instances 1222. This kind of information allows the analyst to classify the request as low, medium or high-risk. The general level of activity for the supplier also appears in the status summary 625. In this example, there are three purchase orders awaiting shipping instructions 1226, four invoices on open account aged at least 30 days 1227 and three pending trade finance requests 1228. The aging information 1227 expands on the overdue payment request indication 1222.

Figures 13, 14:
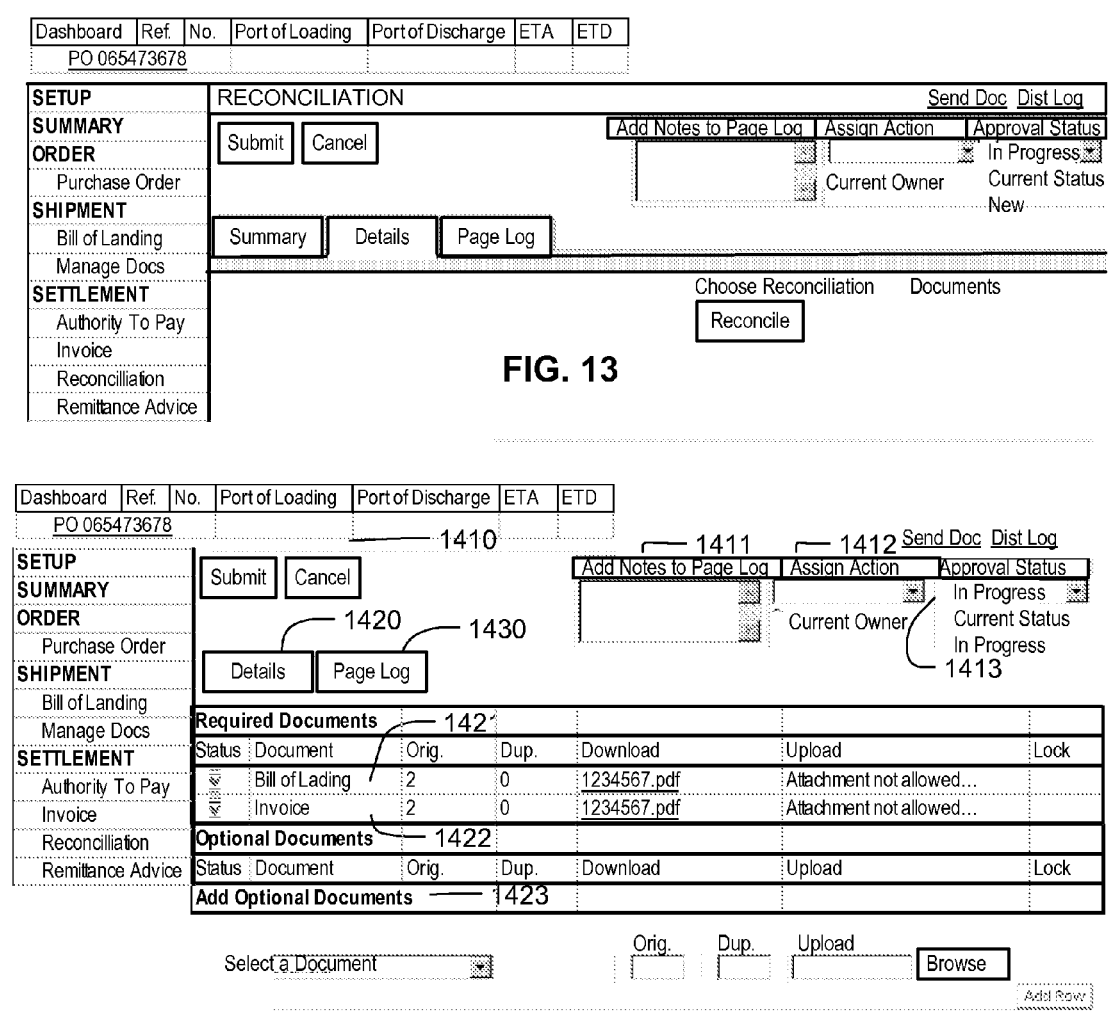

When goods are received, a reconciliation can be performed as indicated by FIG. 13. The details of a reconciliation are beyond the scope of this disclosure.

FIG. 14 depicts an embodiment of a document management interface. In this instance, the manage documents interface has already been exercised by a shipment movement actor to upload a bill of lading 1421 and invoice 1422. A trade finance analyst, for instance, is not allowed to upload either a bill of lading or invoice, but can download either. Sections of the document management interface include a header section 1410, details 1420 and access to the page log 1430. In the header section, a user can add notes to the page log 1411, assign an action to be performed in a processing workflow 1412 or change the approval status for a document 1413 for which the user is responsible. In some instances, the user may add optional documents 1423, which are automatically linked with the particular shipment and its movement plan.

SOME PARTICULAR EMBODIMENTS

The present invention may be practiced as a method or device adapted to practice the method. The same method can be viewed from the perspective of a server supporting numerous actors in international commerce or from the perspective of software used by a bank to receive reports from a trusted server. The invention may be at least one article of manufacture such as media impressed with logic to carry out computer-assisted method of supporting numerous actors in international commerce or from the perspective of software used by a bank to receive reports from a trusted server One embodiment is a computer-based method of electronically triggering bank financing activity in support of imports. This method includes registering in a computer based import-export status system an importer, an exporter, a bank and one or more logistics companies. It further involves recording in the import-export status system contractual terms between the importer and the exporter, the contractual terms at least identifying when ownership of goods being imported shifts from the exporter or the exporter's agents to the importer or the importer's agents and when a payment comes due. The method further includes providing authorization controlled access by the logistics companies to the import-export status system and receiving one or more event reports and corresponding logistical documents from the logistics companies regarding movement of the goods. Also, providing authorization controlled access by the importer to the import-export status system and receiving at least one approval report from the importer or the importer's agents regarding an invoice for the goods. Further, tracking the event reports and the approval report against the contractual terms to trigger an electronic report to the bank that the contractual terms of been met and the invoice approved, and providing the bank access to the corresponding logistical documents and the invoice.

One aspect of the embodiment above further includes tracking the event reports and generating a notice to the exporter that it would be timely to generate the invoice for the goods. Another aspect further includes receiving in INCO terminology at least some of the contractual terms and automatically translating the INCO terminology into a trigger they can be compared to the event reports. Yet another aspect, which may be combined with the embodiment above and any of the aspects mentioned above, further includes triggering a payment by the bank to the exporter from the importer's line of credit. The method further may trigger a discount on interest payable by the importer for financing the payment, in consideration of prompt reporting of the electronic report, which may lead to an opportunity for the bank to factor the payment with the exporter. Alternatively, the method may further trigger an extended time for the importer to repay amounts advanced from the importer's line of credit, in consideration for prompt reporting of the electronic report. More generally, the method may trigger financial consideration in favor of the importer upon an opportunity arising for or realization by the bank of revenue from a factoring with the exporter of payment for the goods, in consideration of prompt electronic transmission of the electronic report.

An alternative or additional aspect of the embodiment further includes receiving from the exporter a trade financing request supported by the electronic report to the bank that the contractual terms have been met and the invoice approved and forwarding the request to the bank.

Another embodiment is a method of receiving timely notice of satisfaction of a threshold condition related to transfer of title. This method, from the perspective of a financing institution, includes registering an entity electronically with a system trusted to reliably track international shipment movement. The registered entity is identified in a role having in interest in international shipment movement reaching a threshold condition, the condition corresponding to a change of title to goods in at least some international shipment movements. It further includes receiving an electronic request by a seller or buyer of a particular shipment for financing after the threshold condition has been satisfied by the particular shipment's international movement, supported by a report from the trusted system and by logistical documents electronically linked to said report. Thereafter, accessing an electronic copy of the supporting logistical documents.

In one aspect of the second embodiment, the electronic request for financing is received from the trusted system. Alternatively or cumulatively, electronic request for financing is supported by at least a bill of lading and an invoice electronically linked to the report of the particular shipment's international movement. When the electronic request for financing comes from the seller of the particular shipment, the method may further include extending credit to the seller and making an electronic transfer to a bank nominated by the seller at a date prior to the due date of the invoice. Furthermore, it may include requesting that the trusted system communicate to the buyer remittance instructions, whereby at least some of the extending credit would be repaid. When the electronic request for financing comes from the buyer, the method may further include making an electronic transfer to a bank nominated by the seller at a date on or prior to the due date of the invoice and extending credit to the buyer in a similar amount.

A third embodiment is a method secure and reliable automatic recognition of threshold condition satisfaction related to international reporting of shipment movement. This method includes exposing a registration module via a public or private network and registering data sources in a plurality of countries involved in international shipment movement to report the shipment movement. Registering includes establishing a secure connection, authenticating the data source and exposing a reporting module limited to an assigned role for the data source. The method further includes establishing a database of particular threshold conditions and required particular supporting logistical documents, automatically translating shipping terminology into the particular threshold conditions applicable to particular shipment movements. The method also includes accepting from the data sources reports of the particular shipment movements and automatically linking the reports to the required particular supporting logistical documents provided by the data sources. Then, accepting an electronically submitted invoice and automatically linking the invoice to the particular shipment movements. The method includes monitoring the reports and comparing them to the threshold conditions, notifying at least one interested party who is not moving shipments that the particular shipment movement has reached the particular threshold condition and that the required supporting logistical documents have been linked and exposing the linked supporting logistical documents and invoice to interested party.

The aspects applicable to the first embodiment are likewise applicable to the third embodiment.

Any of the embodiments or aspects above may be practiced by a server-based system including at least one secure network connection and logic and resources coupled to the secure network connection adapted to carry out the method as described. The embodiments and aspects above also may be practiced as one or more machine readable memories impressed with logic to carry out the methods as described.

While the present invention is disclosed by reference to the preferred embodiments and examples detailed above, it is understood that these examples are intended to be illustrative rather than limiting. Computer-assisted processing is implicated in the described embodiments. It is contemplated that modifications and combinations will readily occur to those skilled in the art, which modifications and combinations will be within the spirit of the invention and the scope of the following claims.

We claim as follows:

1. A method of secure and reliable automatic recognition of threshold condition satisfaction related to international reporting of shipment movement, the method including;

exposing a registration module via a public or private network;

registering computerized data sources in a plurality of countries involved in international shipment movement to report the shipment movement, including establishing a secure connection, authenticating the computerized data source and exposing a reporting module via the public or private network consistent with assigned roles for the computerized data sources;

establishing a computerized database of particular threshold conditions and required particular supporting logistical documents;

computing the particular threshold conditions of interest and associated logistical document collection requirements by automatically translating INCO shipping terminology as applicable to particular shipment movements;

accepting from the computerized data sources reports of the particular shipment movements and automatically linking the reports to the required particular supporting logistical documents provided by the computerized data sources;

accepting an electronically submitted invoice and automatically linking the invoice to the particular shipment movements; and monitoring, using a computer, the reports and comparing them to the threshold conditions, notifying at least one interested party who is not moving shipments that the particular shipment movement has reached the particular threshold condition and that the required supporting logistical documents have been linked, and exposing the linked supporting logistical documents and the invoice to the interested party.

2. The method of claim 1, further including tracking the event reports and generating a notice to the exporter that it would be timely to generate the invoice for the goods.

3. The method of claim 1, further including receiving in INCO terminology at least some of the contractual terms and automatically translating the INCO terminology into a trigger that can be compared to the event reports.

4. The method of claim 1, further including triggering a payment by the bank to the exporter from the importer's line of credit.

5. The method of claim 4, further including triggering a discount on interest payable by the importer for financing the payment, in consideration of prompt reporting of the advice leading to an opportunity for the bank to factor the payment with the exporter.

6. The method of claim 4, further including triggering an extended time for the importer to repay amounts advanced from the importer's line of credit, in consideration of prompt reporting of the advice leading to an opportunity for the bank to factor the payment with the exporter.

7. The method of claim 1, further including receiving from the exporter a trade financing request supported by the electronic report to the bank that the contractual terms have been met and the invoice approved and forwarding the request to the bank.

8. The method of claim 1, further including promptness of the electronic transmission of advice electronically triggering financial consideration in favor of the importer upon realization by the bank of revenue from a factoring with the exporter of payment for the goods.

9. A server-based system including:
   at least one secure network connection;
   a computer with resources coupled to the secure network connection adapted to
   expose a registration module via a public or private network;
   register data sources in a plurality of countries involved in international shipment movement to report the shipment movement, including
   establishing a secure connection,
   authenticating the data source and
   exposing a reporting module via the public or private network consistent with assigned roles for the data sources;
   establish a database of particular threshold conditions and required particular supporting logistical documents;
   compute the particular threshold conditions of interest and associated logistical document collection requirements by automatically translating INCO shipping terminology as applicable to particular shipment movements;
   accept from the data sources reports of the particular shipment movements and automatically linking the reports to the required particular supporting logistical documents provided by the data sources;
   accept an electronically submitted invoice and automatically linking the invoice to the particular shipment movements; and
   monitor the reports and comparing them to the threshold conditions, notifying at least one interested party who is not moving shipments that the particular shipment movement has reached the particular threshold condition and that the required supporting logistical documents have been linked, and exposing the linked supporting logistical documents and the invoice to the interested party.

10. One or more machine readable memories impressed with logic adapted to
    expose a registration module via a public or private network;
    register data sources in a plurality of countries involved in international shipment movement to report the shipment movement, including
    establishing a secure connection.
    authenticating the data source and
    exposing a reporting module via the public or private network consistent with assigned roles for the data sources;
    establish a database of particular threshold conditions and required particular supporting logistical documents;
    compute the particular threshold conditions of interest and associated logistical document collection requirements by automatically translating INCO shipping terminology as applicable to particular shipment movements;
    accept from the data sources reports of the particular shipment movements and automatically linking the reports to the required particular supporting logistical documents provided by the data sources;
    accept an electronically submitted invoice and automatically linking the invoice to the particular shipment movements; and
    monitor the reports and comparing them to the threshold conditions, notifying at least one interested party who is not moving shipments that the particular shipment movement has reached the particular threshold condition and that the required supporting logistical documents have been linked, and exposing the linked supporting logistical documents and the invoice to the interested party.

* * * * *